C. G. TROSIEN.
GEAR LOCK FOR AUTOMOBILES.
APPLICATION FILED AUG. 16, 1919.
1,353,119.
Patented Sept. 14, 1920.
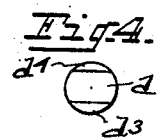
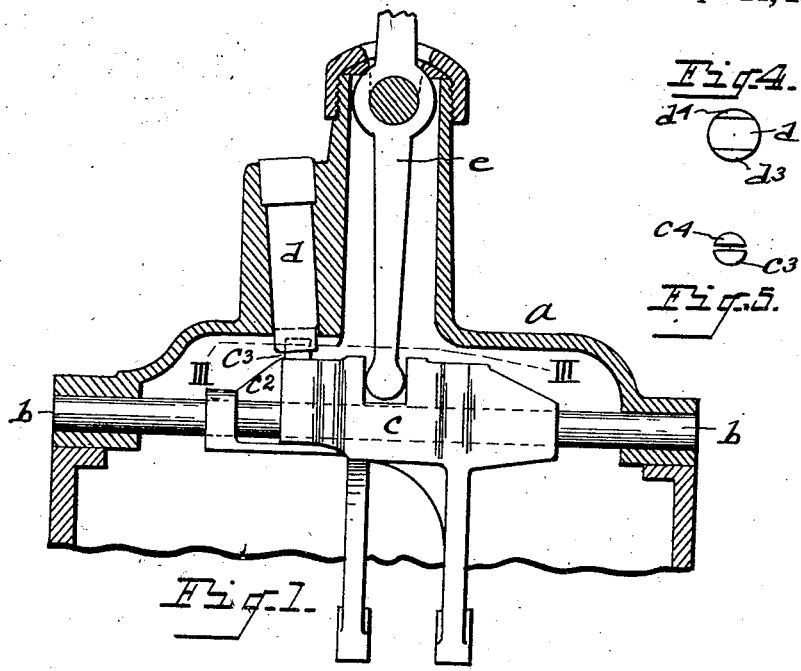
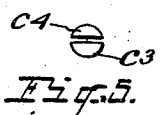
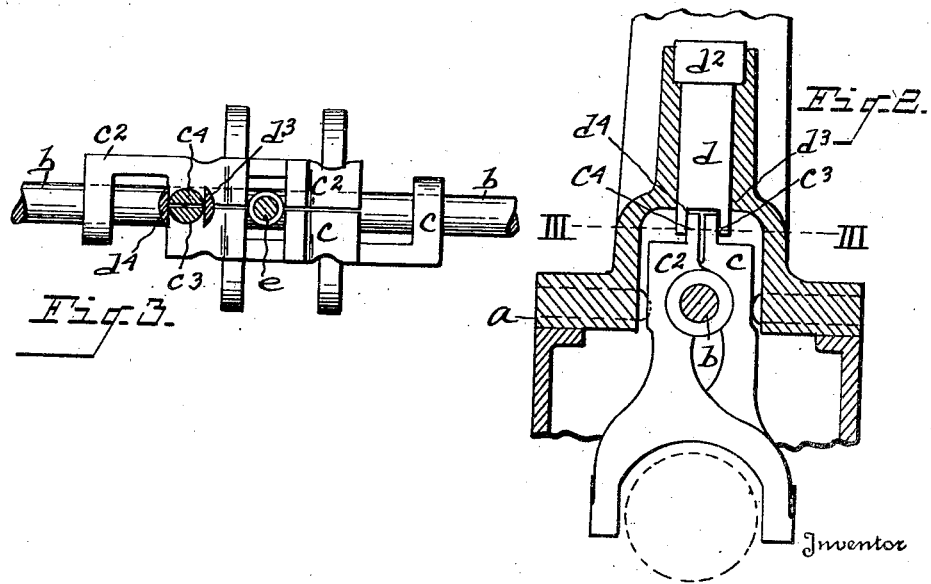
Inventor
CHARLES G. TROSIEN.
By Ralzemond A. Parker
Attorney

UNITED STATES PATENT OFFICE.

CHARLES G. TROSIEN, OF PONTIAC, MICHIGAN.

GEAR-LOCK FOR AUTOMOBILES.

1,353,119.  Specification of Letters Patent.  Patented Sept. 14, 1920.

Application filed August 16, 1919. Serial No. 317,857.

*To all whom it may concern:*

Be it known that I, CHARLES G. TROSIEN, a citizen of the United States, residing at Pontiac, county of Oakland, State of Michigan, have invented a certain new and useful Improvement in Gear-Locks for Automobiles, and declare the following to be a full, clear, and exact description of the same, such as will enable others skilled in the art to which it pertains to make and use the same, reference being had to the accompanying drawings, which form a part of this specification.

My invention relates to gear locks for automobiles and an object of my improvements is to provide a simple and strong means for locking the portions of the change speed gearing which move parallel to each other. I have shown my invention embodied in an apparatus in connection with a Buick change speed gear.

In the drawings,—

Figure 1 is a sectional elevation of an apparatus embodying my invention and parts adjacent and coacting therewith.

Fig. 2 is a sectional elevation of the same, the section being taken in a plane at right angles to that of Fig. 1.

Fig. 3 is a section on the line III—III of Fig. 2, the casing being omitted.

Fig. 4 is an inverted plan view showing the lower end of the cam rod.

Fig. 5 is a diagram representing the lugs on the moving parts of the change speed gearing.

$a$ is the change speed gear casing; $e$ is the gear-shifting lever; $b$ is a horizontal rod bearing in the casing $a$. $c$, $c^2$ are sleeves having the striker forks extending therefrom, both of said sleeves engaging and sliding upon the rod $b$, as in the conventional construction. $c^3$ is a semi-cylindrical lug rising from the part $c$ at the inner edge of the part $c^2$. Lugs $c^3$, $c^4$, when the gearing is in its neutral position, together form a cylindrical projection rising vertically from the parts $c$ and $c^2$. $d$ is a rod adapted to turn in the casing $a$ and extending approximately at right angles to the motion of the parts $c$, $c^2$ and approximately axially in line with the lug $c^3$, $c^4$. The upper part of the rod $d$ is provided with a pin lock and the rod may be turned by a key in the usual form. The lower end of the rod $d$ is provided with lugs or forks $d^3$, $d^4$ spaced from each other at a distance approximately equal to the diameter of the lug $c^3$, $c^4$. The lugs or forks $d^3$, $d^4$ extend down beside the lugs $c^3$, $c^4$.

The operation of the above-described device is as follows:

When the parts $c$, $c^2$ are in position such that the change speed gearing shall be in its neutral position, the lugs $c^3$, $c^4$ come beside each other, as shown in Figs. 3 and 5. When the rod $d$ is turned to the position shown in Fig. 2, and indicated in Fig. 1, the parts $c$, $c^2$ are free to move, the lugs passing through the opening between the forks or lugs $d^3$, $d^4$ without contacting such lugs. When the lugs $d^3$, $d^4$ turn to a position at right angles to that just described, the lugs $d^3$, $d^4$ are interposed in the line of travel of the lugs $c^3$, $c^4$, as shown in Fig. 3 and the parts $c$, $c^2$ are thereby locked and restrained from movement along the guide rod $d$.

What I claim is:

1. In an apparatus of the kind described, two adjacent parts moving parallel to each other and adapted to shift the change speed gearing, a salient engaging means on each of said parts, a locking part rotatable about its axis adapted to engage said engaging means in one angular position to prevent the motion of its parts, and to leave said parts free at another angular position, an inclosing casing, said locking part extending through and bearing in the wall of said casing.

2. In an apparatus of the kind described, two parts adapted to move parallel and adjacent to each other to shift the change speed gearing, a lug rising from one of said parts, a lug rising from the other of said parts, said lugs being so located that they shall come adjacent to each other at the neutral position of the gearing, and a locking part extending through the gear casing and adapted to turn to one position and engage said lugs to prevent the motion of said parts, or to another position to permit the free movement of said parts.

3. In a change speed gearing, the combination of two parts adapted to move parallel and adjacent to each other, a lug rising from each of said parts, a locking part extending through the casing and having lugs at its lower ends forming branches of a fork extending over said lugs, said locking part being so constructed that it shall permit the free movement of the members in one position of its branches and shall interpose its branches in the line of travel of said members in its other position.

4. In an apparatus of the kind described, two parts adapted to move parallel and adjacent to each other to shift the change speed gearing, a lug rising from one of said parts, a lug rising from the other of said parts, said lugs being so located that they shall come adjacent to each other at the neutral position of the gearing, and a rod extending through the gear casing adapted to engage said lugs to prevent the motion of said parts and to disengage said lugs.

In testimony whereof, I sign this specification.

CHARLES G. TROSIEN.